United States Patent
Moon et al.

(10) Patent No.: US 9,099,731 B2
(45) Date of Patent: Aug. 4, 2015

(54) SECONDARY BATTERY WITH A BIMETAL ELEMENT ON A TOP SURFACE OF A CAP PLATE

(75) Inventors: Jongseok Moon, Suwon-si (KR); Sangwon Byun, Suwon-si (KR); Seokyoon Yoo, Suwon-si (KR); Chiyoung Lee, Suwon-si (KR); Yoontai Kwak, Suwon-si (KR); Dongwook Kim, Suwon-si (KR); Tatsuya Hashimoto, Suwon-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 1045 days.

(21) Appl. No.: 12/923,944

(22) Filed: Oct. 15, 2010

(65) Prior Publication Data

US 2011/0183167 A1    Jul. 28, 2011

(30) Foreign Application Priority Data

Jan. 27, 2010  (KR) .......................... 10-2010-0007463

(51) Int. Cl.
*H01M 10/50* (2006.01)
*H01M 2/34* (2006.01)

(52) U.S. Cl.
CPC ....................... *H01M 2/34* (2013.01)

(58) Field of Classification Search
CPC .......................................................... H01M 2/34
USPC ............................ 429/179, 61, 62, 178, 53, 7
See application file for complete search history.

(56) References Cited

U.S. PATENT DOCUMENTS

| | | | |
|---|---|---|---|
| 2006/0121336 A1* | 6/2006 | Yoon ............................... | 429/53 |
| 2008/0143337 A1* | 6/2008 | Fujikawa et al. ............. | 29/623.1 |
| 2009/0186269 A1* | 7/2009 | Kim et al. ..................... | 429/179 |
| 2009/0317665 A1 | 12/2009 | Maeng et al. | |
| 2011/0135976 A1* | 6/2011 | Byun .............................. | 429/61 |

FOREIGN PATENT DOCUMENTS

| | | |
|---|---|---|
| JP | 2005-285624 A | 10/2005 |
| KR | 10-2009-0132926 A | 12/2009 |

OTHER PUBLICATIONS

Office Action issued in corresponding Korean application, 10-2010-0007463, dated Apr. 25, 2011.

* cited by examiner

*Primary Examiner* — Milton I Cano
*Assistant Examiner* — Ling R Zeng
(74) *Attorney, Agent, or Firm* — Lee & Morse, P.C.

(57) ABSTRACT

A secondary battery including an electrode assembly including a first electrode plate, a second electrode plate, and a separator disposed between the first electrode plate and the second electrode plate; a case accommodating the electrode assembly; a cap plate sealing the case; a first electrode terminal electrically connected to the first electrode plate and penetrating through the cap plate; and a safety valve coupled to the first electrode terminal, the safety valve including a bimetal element.

13 Claims, 8 Drawing Sheets

SECONDARY BATTERY WITH A BIMETAL ELEMENT ON A TOP SURFACE OF A CAP PLATE

BACKGROUND

1. Field

Embodiments relate to a secondary battery.

2. Description of the Related Art

Unlike a primary battery which is not rechargeable, a secondary battery is capable of being charged and discharged. A low-capacity secondary battery composed of a single battery cell may be used as a power source for various small portable electronic devices, e.g., cellular phones and camcorders. A high-capacity secondary battery in which a plurality of battery cells are connected to each other in a pack structure may be used as a power source for, e.g., driving a motor of a hybrid electric vehicle (HEV).

Secondary batteries may be manufactured in various shapes. Generally, secondary batteries may be classified as a cylindrical shape battery or a prismatic shape battery. The secondary battery may be formed such that an electrode assembly, including a separator as an insulator between positive and negative electrode plates, and an electrolyte are accommodated in a case. A cap assembly having electrode terminals may be provided on the case.

If excessive heat is generated in the secondary battery or the electrolyte is decomposed, an internal pressure of the battery may increase, resulting in fire or explosion.

SUMMARY

Embodiments are directed to a secondary battery, which represents advances over the related art.

It is a feature of an embodiment to provide a secondary battery that can improve safety by preventing fire or explosion caused by internal heat of the secondary battery.

At least one of the above and other features and advantages may be realized by providing a secondary battery including an electrode assembly including a first electrode plate, a second electrode plate, and a separator disposed between the first electrode plate and the second electrode plate; a case accommodating the electrode assembly; a cap plate sealing the case; a first electrode terminal electrically connected to the first electrode plate and penetrating through the cap plate; and a safety valve coupled to the first electrode terminal, the safety valve including a bimetal element.

The bimetal element may include a first expansion layer and a second expansion layer, the second expansion layer having a thermal expansion coefficient smaller than a thermal expansion coefficient of the first expansion layer.

The second expansion layer may face a top surface of the cap plate.

The safety valve may be configured to effect an electrical short-circuit on the top surface of the cap plate when an internal temperature of the secondary battery is about 80° C. to about 150° C.

The safety valve may be configured to effect an electrical short-circuit on the top surface of the cap plate when an internal temperature of the secondary battery is greater than about 80° C.

The second expansion layer may face a bottom surface of the cap plate.

The safety valve may be configured to effect an electrical short-circuit on the bottom surface of the cap plate when an internal temperature of the secondary battery is about 80° C. to about 150° C.

The safety valve may be configured to effect an electrical short-circuit on the bottom surface of the cap plate when an internal temperature of the secondary battery is higher than about 80° C.

The first electrode terminal may penetrate through a terminal hole, the terminal hole being disposed at one side of the safety valve.

The first electrode terminal may include a first terminal body penetrating through the cap plate; a first terminal connection part electrically connected to the first terminal body and being disposed under the cap plate; and a first terminal extension part extending from the first terminal connection part in a vertical direction and being welded to the electrode assembly.

The safety valve may be coupled to an upper portion of the first terminal body and disposed outside the case.

The safety valve may be coupled to a lower portion of the first terminal body and disposed inside the case.

The cap plate may include a short-circuit hole disposed at one side thereof, and a downwardly convex short-circuit plate disposed in the short-circuit hole.

The short-circuit plate may be electrically connected to the cap plate.

The short-circuit plate may be constructed to change its shape to be upwardly convex and to protrude toward the safety valve such as to effect a short-circuit with the safety valve when an internal pressure of the secondary battery exceeds a predetermined pressure.

The first electrode terminal and the cap plate may have opposite polarities.

The secondary battery may further include a second electrode terminal electrically connected to the second electrode plate, the second electrode terminal having the same polarity as the cap plate.

The second electrode terminal may include a second terminal body penetrating through the cap plate; a second terminal connection part electrically connected to the second terminal body and disposed under the cap plate; and a second terminal extension part extending from the second terminal connection part in a vertical direction and being welded to the electrode assembly.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
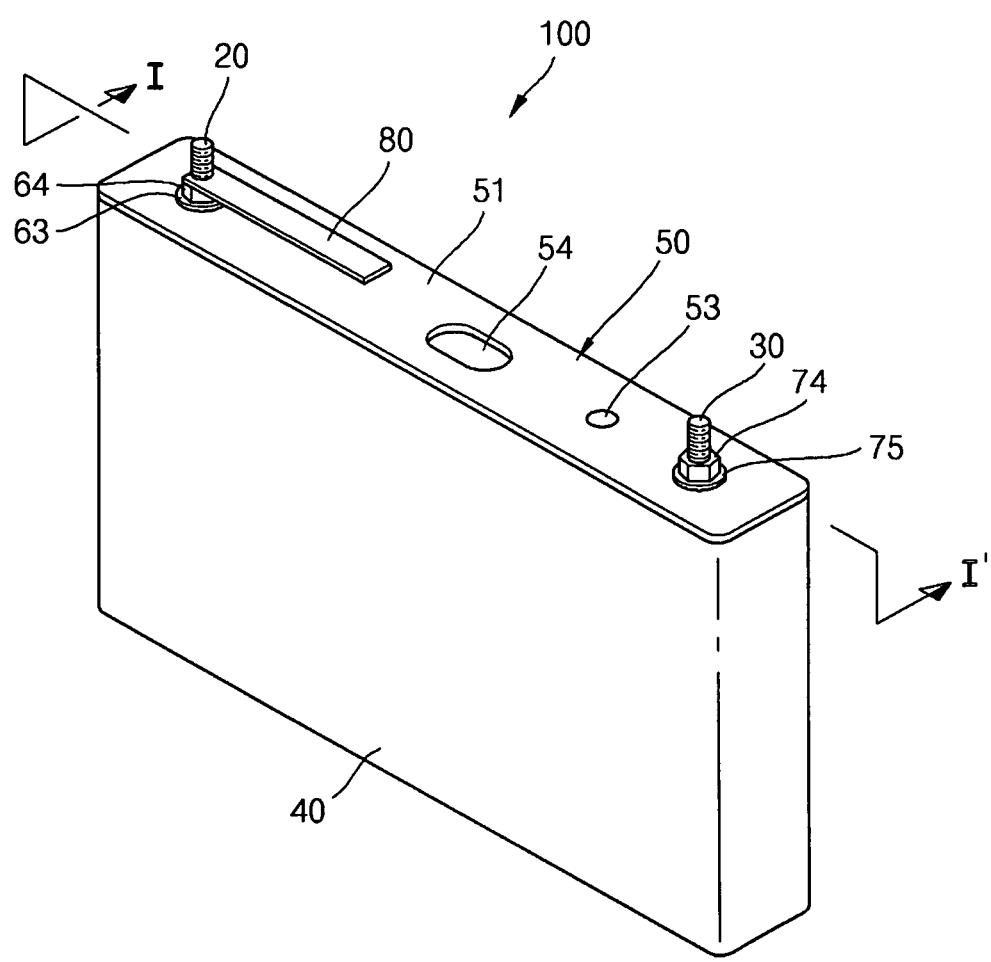
FIG. 1A illustrates a perspective view of a secondary battery according to an embodiment.

Korean Patent Application No. 10-2010-0007463, filed on Jan. 27, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 1B:
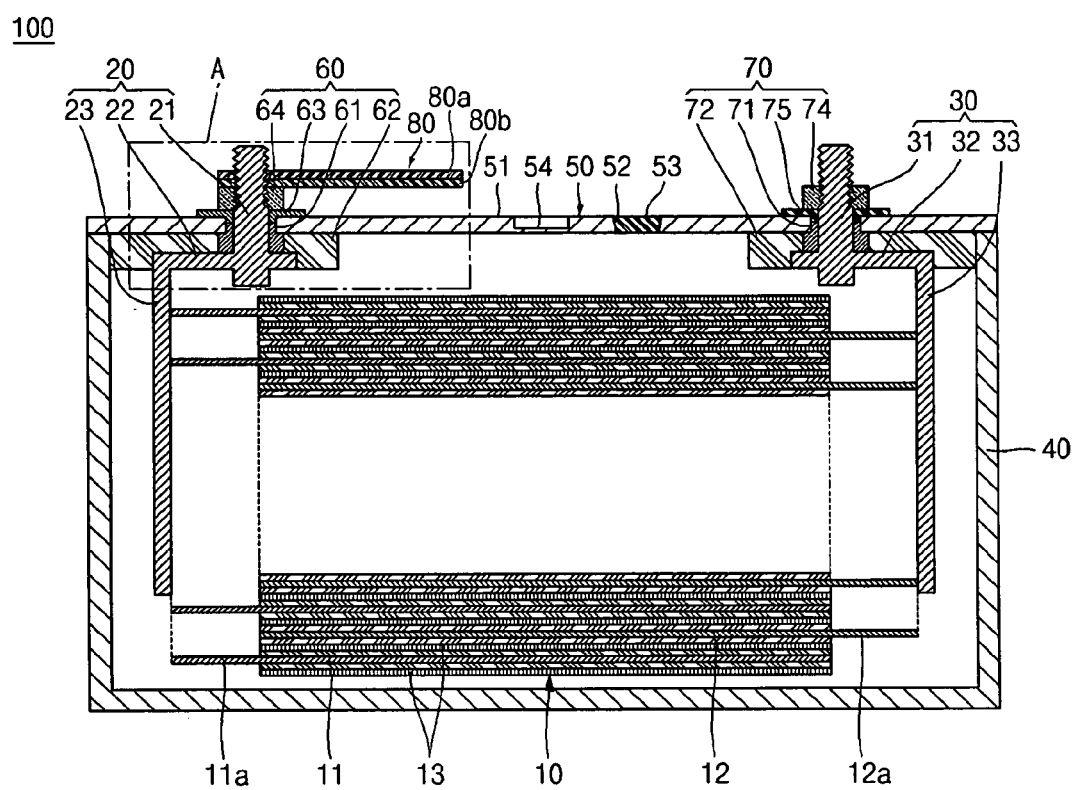
FIG. 1B illustrates a cross-sectional view of the secondary battery shown in FIG. 1A, taken along the line I-I' of FIG. 1A.
Figure 1C:
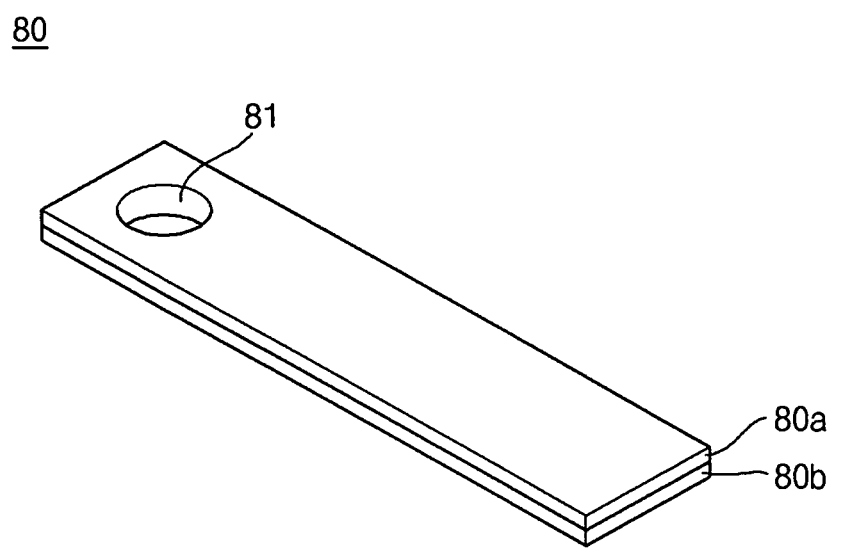
FIG. 1C illustrates a perspective view of a safety valve shown in FIG. 1B.
Figure 1D:
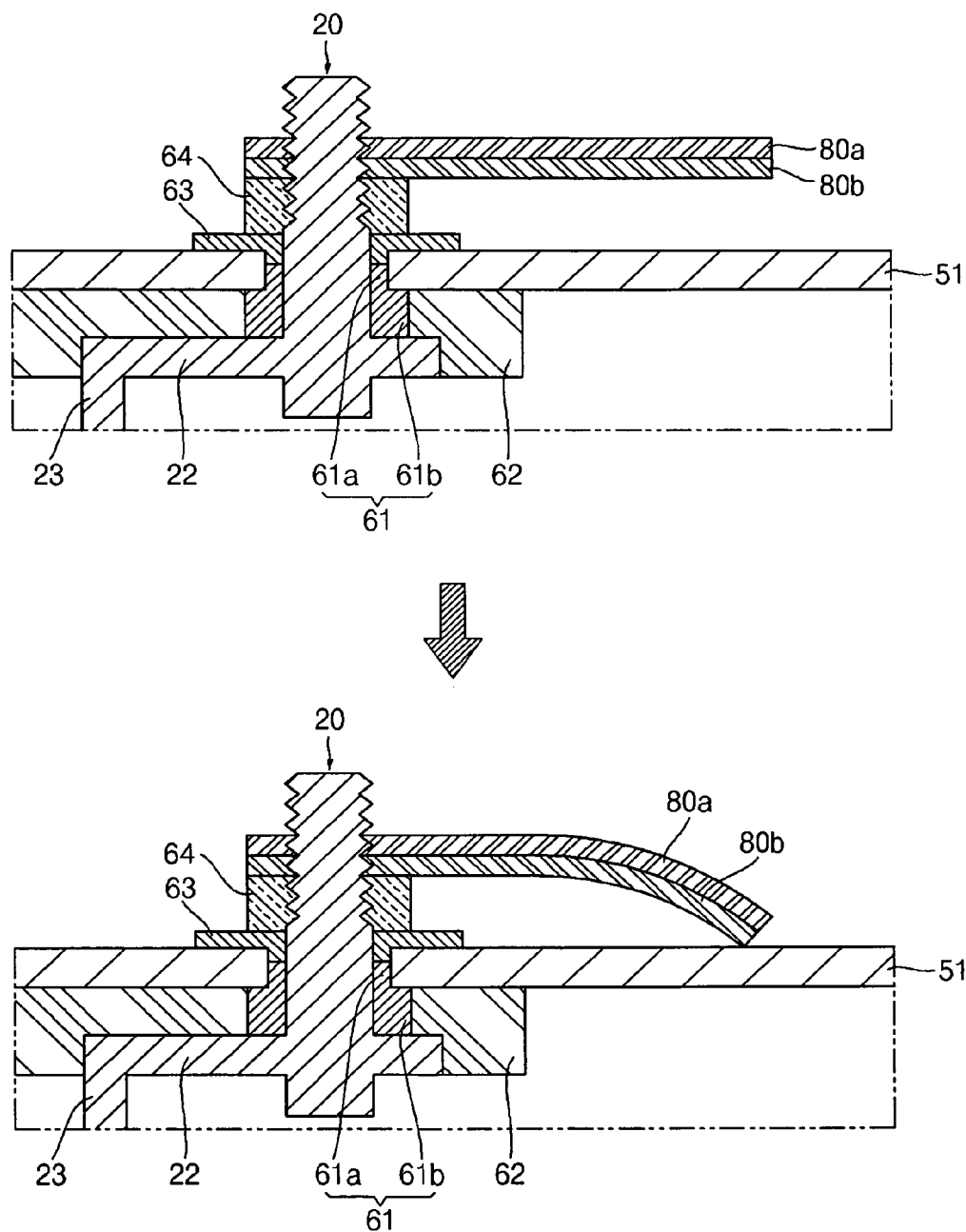
FIG. 1D illustrates an enlarged cross-sectional view of a portion 'A' illustrated in FIG. 1A, for showing operation of the safety valve.

FIG. 1A illustrates a perspective view of a secondary battery according to an embodiment. FIG. 1B illustrates a cross-sectional view of the secondary battery illustrated in FIG. 1A, taken along the line I-I' of FIG. 1A. FIG. 1C illustrates a perspective view of a safety valve illustrated in FIG. 1B. FIG. 1D illustrates an enlarged cross-sectional view of a portion 'A' illustrated in FIG. 1A, for showing operation of the safety valve.

Referring to FIGS. 1A through 1D, the secondary battery 100 according to an embodiment may include an electrode assembly 10, a first electrode terminal 20, a second electrode terminal 30, a case 40, a cap assembly 50, and a safety valve 80.

The electrode assembly 10 may be formed by winding or stacking a laminate of a first electrode plate 11, a separator 13, and a second electrode plate 12, each formed of a thin film or layer. The first electrode plate 11 may function as a negative electrode and the second electrode plate 12 may function as a positive electrode.

The first electrode plate 11 may be formed by coating a first electrode active material, e.g., graphite or carbon, on a first electrode collector formed of a metal foil made of, e.g., nickel or copper. The first electrode plate 11 may include a first electrode non-coating portion 11a that is not coated with a first active material. The first electrode non-coating portion 11a serve as a passage for current flow between the first electrode plate 11 and the first electrode terminal 20. However, materials of the first electrode plate 11 are not limited thereto.

The second electrode plate 12 may be formed by coating a second electrode active material, e.g., a transition metal oxide, on a second electrode collector formed of a metal foil made of, e.g., aluminum. The second electrode plate 12 may include a second electrode non-coating portion 12a that is not coated with a second active material. The second electrode non-coating portion 12a may serve as a passage for current flow between the second electrode plate 12 and the second electrode terminal 30. However, materials of the second electrode plate 12 are not limited thereto.

The first electrode plate 11 and the second electrode plate 12 may be arranged after changing polarities thereof.

The separator 13 may be positioned between the positive electrode plate 11 and the negative electrode plate 12. The separator 13 may prevent an electrical short-circuit between the electrode plates to allow for movement of lithium ions. The separator 13 may be made of, e.g., polyethylene, polypropylene, and/or a composite film of polyethylene and polypropylene, but is not limited thereto.

The first electrode terminal 20 and the second electrode terminal 30 may be coupled to both ends of the electrode assembly 10, i.e., the first electrode plate 11 and the second electrode plate 12, respectively.

The electrode assembly 10 may be accommodated in the case 40 with electrolyte (not shown). The electrolyte may include an organic solvent, e.g., ethylene carbonate (EC), propylene carbonate (PC), diethyl carbonate (DEC), ethylmethyl carbonate (EMC), and/or dimethyl carbonate (DMC), as well as a lithium salt, e.g., $LiPF_6$, or $LiBF_4$. The electrolyte may exist in a liquid, solid, or gel phase.

When the electrolyte infiltrates an area between the first electrode terminal 20 and the cap assembly 50 or an area between the second electrode terminal 30 and the cap assembly 50, it may cause an electrical short-circuit between the first electrode terminal 20 and the cap assembly 50, or between the second electrode terminal 30 and the cap assembly 50.

The first electrode terminal 20 may be made of a conductive material, e.g., nickel (Ni), and may be electrically connected to the first electrode plate 11 by being welded to the first electrode non-coating portion 11a protruding toward one end of the electrode assembly 10. The first electrode terminal 20 may include a first terminal body 21, a first terminal connection part 22, and a first terminal extension part 23.

The first terminal body 21 may penetrate through the cap assembly 50 and then be fixed to the cap assembly 50. A thread may be formed at an upper portion of the first terminal body 21 and a lower portion of the first terminal body 21 may protrude toward a lower portion of the first terminal connection part 22. The first electrode terminal 20 may be insulated from a cap plate 51 of the cap assembly 50.

The first terminal connection part 22 may extend horizontally from the first terminal body 21 to be positioned on a bottom surface of the cap assembly 50.

The first terminal extension part 23 may extend vertically from an end of the first terminal connection part 22 to be coupled to the first electrode non-coating portion 11a of the electrode assembly 10. In other words, the first terminal extension part 23 may be welded to the first electrode non-coating portion 11a.

The second electrode terminal 30 may be made of a conductive material, e.g., aluminum (Al), and may be electrically connected to the second electrode plate 12 by being closely adhered to the second electrode non-coating portion 12a protruding toward the other end of the electrode assembly 10. The second electrode terminal 30 may include a second terminal body 31, a second terminal connection part 32, and a second terminal extension part 33.

The second terminal body 31, the second terminal connection part 32, and the second terminal extension part 33 of the second electrode terminal 30 may be substantially the same as first terminal body 21, the first terminal connection part 22, and the first terminal extension part 23 of the first electrode terminal 20 in view of configuration and function, except that the second electrode terminal 30 may be electrically connected to the cap plate 51. Accordingly, repeated detailed description thereof will be omitted.

The case 40 may be made of a conductive metal, e.g., aluminum (Al), Al alloy, or Ni-plated steel, and may be formed in a substantially cuboid shape having an opening in which the electrode assembly 10, the first electrode terminal 20, the second electrode terminal 30 and electrolyte (not shown) may be accommodated. Although FIGS. 1A and 1B illustrate a state in which the case 40 and the cap assembly 50 are coupled to each other without the illustrated opening, the perimeter of the cap assembly 50 may be a portion that is substantially opened. An internal surface of the case 40 may be subjected to insulation treatment so that the case 40 may be electrically insulated from the electrode assembly 10, the first electrode terminal 20, and the second electrode terminal 30.

The cap assembly 50 may be coupled to the case 40. The cap assembly 50 may include the cap plate 51. The cap plate 51 may seal an opening of the case 40 and may be made of the same materials as the case 40. The cap plate 51 may have the same polarity as the case 40. In addition, the cap plate 51 may include a plug 53 that closes the electrolyte injection hole 52 and a safety valve 54 that has a relatively small thickness.

The cap assembly 50 may further include a first sealing part 60 and a second sealing part 70.

The first sealing part 60 may include a first seal gasket 61, through which the first terminal body 21 of the first electrode terminal 20 penetrates, a first lower insulation member 62, a first upper insulation member 63, and a first nut 64.

The first seal gasket 61 may include a body 61a and a flange 61b. The body 61a may surround a perimeter of the first terminal body 21 in a substantially tubular shape, thereby preventing an electrical short-circuit between the first terminal body 21 and the cap plate 51. In addition, the flange 61b may be bent from the body 61a and may extend a predetermined length in horizontal and outward directions. Further, the flange 61b may be coupled to a bottom surface of the cap plate 51. In other words, the flange 61b may be positioned between the bottom surface of the cap plate 51 and the first terminal connection part 22. The first seal gasket 61 may prevent, e.g., external moisture from infiltrating into the case 40 through the cap plate 51.

The first lower insulator 62 corresponding to an exterior side of the flange 61b may be coupled to the bottom surface of the cap plate 51. In addition, a portion of the first lower insulator 62 may be disposed between the first terminal connection part 22 and the cap plate 51.

The first upper insulator 63 may be disposed between the first electrode terminal 20 and the cap plate 51 to be fitted into the first electrode terminal 20. the first upper insulator may be coupled to the cap plate 51 and the first seal gasket 61 by the first nut 64. The first upper insulator 63 may insulate the cap plate 51 from the first electrode terminal 20 having a different polarity from the cap plate 51.

The first nut 64 may be engaged with a thread formed in the first electrode terminal 20 to fix the first electrode terminal 20 on the cap plate 51. In addition, the first nut 64 engaged with the thread may be coupled to the first upper insulator 63.

The second sealing part 70 may include a second seal gasket 71 through the second terminal body 31 of the second electrode terminal 30 penetrates, a second lower insulation member 72, a second nut 74, and a second upper connection member 75.

Since the second seal gasket 71, the second lower insulation member 72 and the second nut 74 may have substantially the same configurations and functions as those of the first seal gasket 61, the first lower insulation member 62 and the first nut 64 of the first sealing part 60, repeated explanations thereof will be omitted; and only the difference, including the second upper connection member 75, will be described below in detail.

The second upper connection member 75 may be formed such that the second electrode terminal 30 is inserted between the second electrode terminal 30 and the cap plate 51, and may be coupled to the cap plate 51 and the second seal gasket 71 by the second nut 74. The second upper connection member 75 may be made of a conductive material, e.g., aluminum (Al), and may electrically connect the cap plate 51 to the second electrode terminal 30 having the same polarity as the cap plate 51.

The safety valve 80 may be coupled to an upper portion of the first electrode terminal 20 and may be disposed above the cap plate 51 and outside the case 40. The safety valve 80 may be formed of a bimetal; i.e., it may include a bimetal element which, in turn, includes a first expansion layer 80a and a second expansion layer 80b having different thermal expansion coefficients from one another, thereby forming a bimetal structure. A terminal hole 81 may be disposed at one side of the safety valve 80. The safety valve 80 may be electrically connected to the first electrode terminal 20.

As described above, the safety valve 80 may be formed of two metals, i.e., the bimetal, having different thermal expansion coefficients. In particular, the first expansion layer 80a may have a relatively high thermal expansion coefficient; and the second expansion layer 80b may have a relatively low thermal expansion coefficient. Thus, the first expansion layer 80a may expand much more than the second expansion layer 80b at the same temperature to then be bent toward one side. The second expansion layer 80b may face a top surface of the cap plate 51 and the first expansion layer 80a may be disposed thereon. Accordingly, when the internal temperature of the secondary battery 100 rises, the first expansion layer 80a may further expand, thus causing the safety valve 80 to be bent downwardly.

The first expansion layer 80a may be made of a metal having a high thermal expansion coefficient, e.g., an alloy of nickel (Ni) and iron (Fe), but is not limited thereto.

The second expansion layer 80b may be made of a metal having a low thermal expansion coefficient, e.g., a nickel (Ni)/manganese (Mn)/iron (Fe) alloy, an alloy of nickel (Ni)/molybdenum (Mo)/iron (Fe), or an alloy of nickel (Ni)/manganese (Mn)/copper (Cu), but is not limited thereto.

The terminal hole 81 may be disposed at a portion of the safety valve 80, and is a hole through which the first terminal body 21 may penetrate. The safety valve 80 may be securely fixed to the first electrode terminal 20 by the terminal hole 81.

Operations of the safety valve 80 will now be described with reference to FIG. 1D.

When heat is generated inside the secondary battery 100 due to, e.g., overcharge, etc., internal heat may be transmitted to the safety valve 80 through the first electrode terminal 20. When the internal temperature of the secondary battery 100 is about 80° C. to about 150° C., or exceeds about 80° C., the safety valve 80 may expand. When the internal temperature of the secondary battery 100 is lower than about 80° C., i.e., during normal operation of the secondary battery 1000, the safety valve 80 may not operate, i.e., the safety valve 80 may not contact the cap plate 51. When the internal temperature of the secondary battery 100 is higher than about 150° C., reliability and safety of the secondary battery 100 may deteriorate. Since the safety valve 80 may be made of the bimetal having layers with different thermal expansion coefficients, the first expansion layer 80a having a larger thermal expansion coefficient may expand more than the second expansion layer 80b at the same temperature. Thus, the safety valve 80 may be bent downwardly and may then be short-circuited on the top surface of the cap plate 51. Since the safety valve 80 may be electrically connected to the first electrode terminal 20 and the cap plate 51 may be electrically connected to the second electrode terminal 30, the first electrode terminal 20 and the second electrode terminal 30 may be short-circuited with each other, thereby discharging the secondary battery 100. Due to the discharging, the internal temperature of the secondary battery 100 may be lowered and the safety valve 80, having expanded and bent downwardly, may contract to break the electrical connection with the cap plate 51 and then be restored into its original state. In other words, when the internal temperature of the secondary battery 100 is greater than a predetermined temperature, the safety valve 80 may be short-circuited on the top surface of the cap plate 51, thereby interrupting charging and discharging of the secondary battery 100 to avoid a danger, e.g., fire or explosion.

As described above, since the secondary battery 100 according to an embodiment may include the safety valve 80 electrically connected to the first electrode terminal 20 and may be made of a bimetal. The safety valve 80 may be bent by excessive internal heat due to, e.g., overcharge, etc., to then be short-circuited on the cap plate 51 electrically connected to the second electrode terminal 30. Accordingly, the secondary battery 100 may have improved safety by preventing fire or explosion.

Next, a secondary battery according to another embodiment will be described.

Figure 2A:
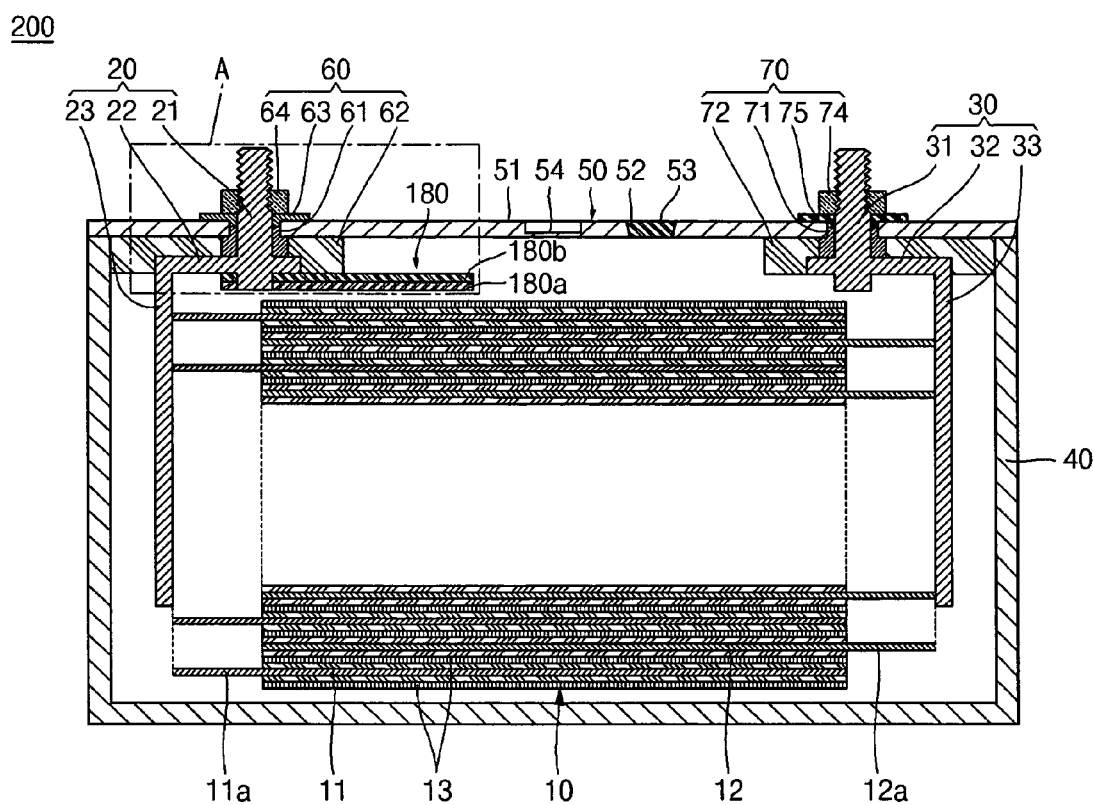
FIG. 2A illustrates a cross-sectional view of a secondary battery according to another embodiment.
Figure 2B:
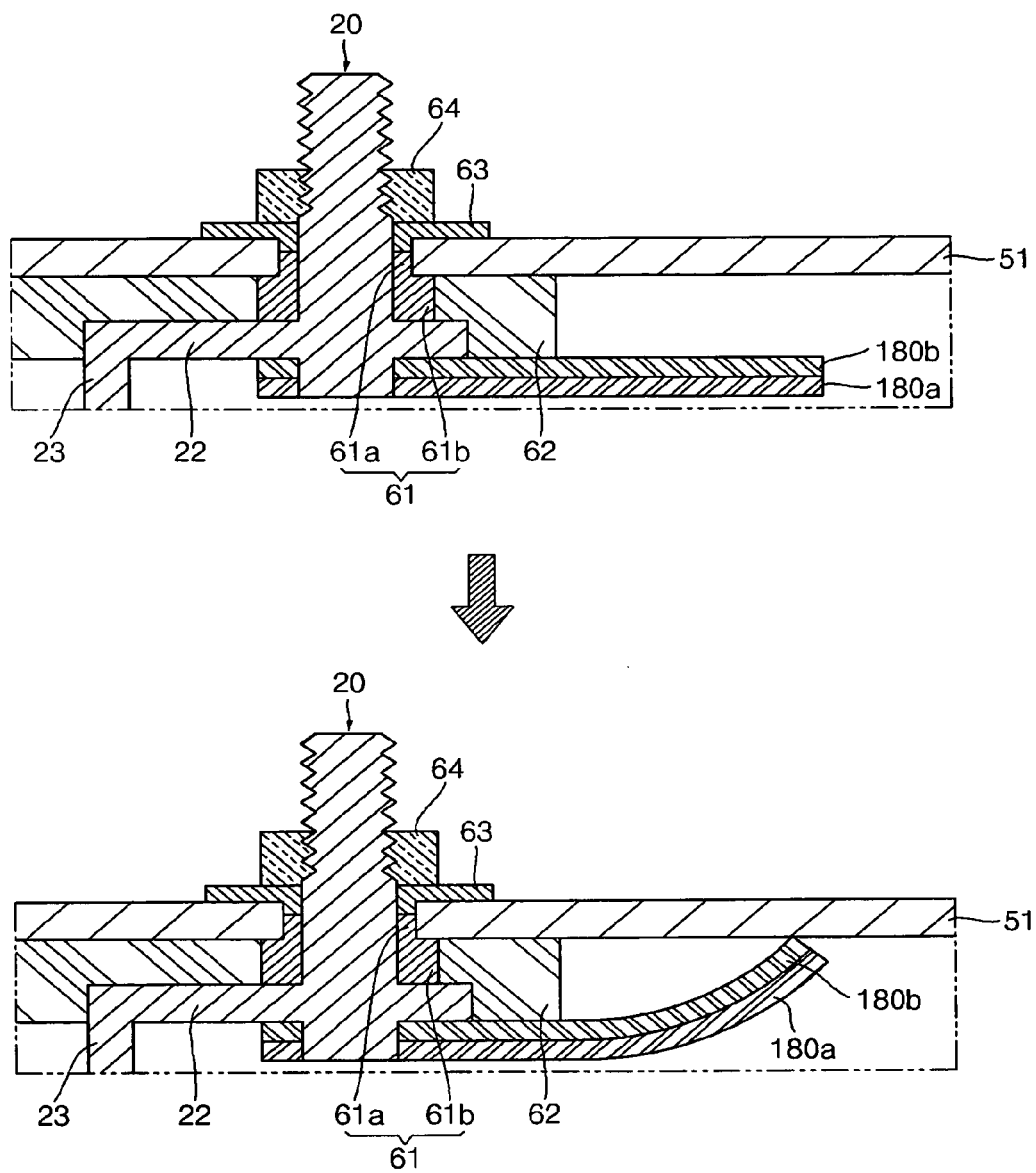
FIG. 2B illustrates an enlarged cross-sectional view of a portion 'A' illustrated in FIG. 2A, for showing operation of the safety valve.

FIG. 2A illustrates a cross-sectional view of a secondary battery according to another embodiment. FIG. 2B illustrates an enlarged cross-sectional view of a portion 'A' illustrated in FIG. 2A, for showing the operation of the safety valve.

The secondary battery 200 according to the present embodiment may be substantially the same as the secondary battery 100 shown in FIG. 1B in view of configuration and function, except for the position of a safety valve 180. Thus, repeated description thereof is omitted and the following description will be focused on only the differences between the secondary battery 200 and the secondary battery 100, i.e., the safety valve 180.

Referring to FIGS. 2A and 2B, the secondary battery 200 according to the present embodiment may include an electrode assembly 10, a first electrode terminal 20, a second electrode terminal 30, a case 40, a cap assembly 50, and a safety valve 180.

The safety valve 180 may be coupled to a lower portion of the first electrode terminal 20 and may be disposed below the cap plate 51 and inside the case 40. The safety valve 180 may be formed of a bimetal including a first expansion layer 180*a* and a second expansion layer 180*b* having different thermal expansion coefficients. The safety valve 180 may be electrically connected to the first electrode terminal 20. The second expansion layer 180*b* may face the bottom surface of the cap plate 51 and the first expansion layer 180*a* may be disposed thereunder. Accordingly, when the internal temperature of the secondary battery 200 rises, the first expansion layer 180*a* may expand and may then be bent upwardly.

Operations of the safety valve 180 will now be described with reference to FIG. 2B.

When heat is generated inside the secondary battery 200 due to, e.g., overcharge, etc., internal heat may be transmitted to the safety valve 180 through the first electrode terminal 20. When the internal temperature of the secondary battery 200 is about 80° C. to about 150° C., or exceeds about 80° C., the safety valve 80 may expand. When the internal temperature of the secondary battery 100 is lower than about 80° C., the safety valve 180 may not operate, i.e., may not contact the cap plate 51. When the internal temperature of the secondary battery 200 is higher than about 150° C., reliability and safety of the secondary battery 200 may deteriorate. Since the safety valve 180 may be made of a bimetal having different thermal expansion coefficients, the first expansion layer 180*a* having a larger thermal expansion coefficient may expand more than the second expansion layer 180*b* at the same temperature.

Therefore, the safety valve 180 may be bent upwardly and may then be short-circuited on the bottom surface of the cap plate 51. Due to the short-circuiting, and resultant interruption of charging/discharging, the internal temperature of the secondary battery 200 may be lowered and the safety valve 180, having expanded and bent upwardly, may contract to break the electrical connection with the cap plate 51 and be restored into its original state. In other words, when the internal temperature of the secondary battery 200 is greater than a predetermined temperature, the safety valve 180 may be short-circuited on the bottom surface of the cap plate 51, thereby interrupting charging and discharging of the secondary battery 200 to avoid a danger, e.g., fire or explosion.

As described above, since the secondary battery 200 according to the present embodiment may include the safety valve 180 electrically connected to the first electrode terminal 20 and may be made of a bimetal. The safety valve 180 may be bent by excessive internal heat due to, e.g., overcharge, etc., to then be short-circuited to the cap plate 51 electrically connected to the second electrode terminal 30. Accordingly, the secondary battery 200 may have improved safety by preventing fire or explosion.

Next, a secondary battery according to yet another embodiment will be described.

Figure 3A:
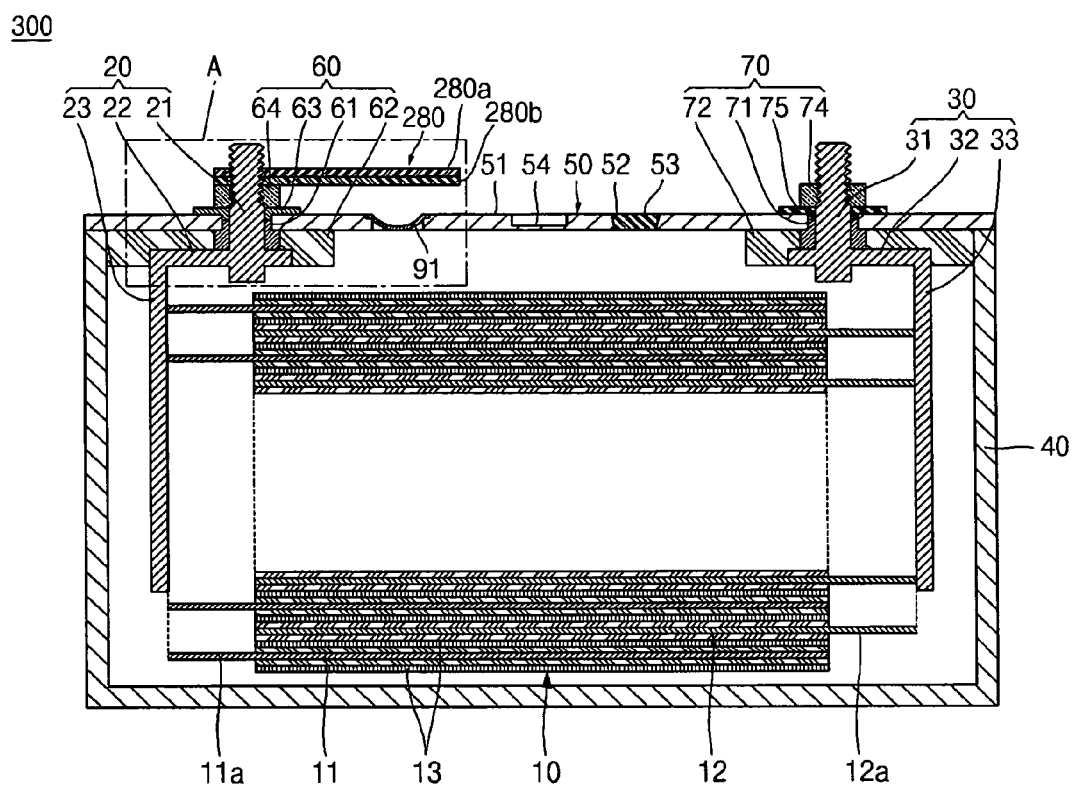
FIG. 3A illustrates a cross-sectional view of a secondary battery according to yet another embodiment.
Figure 3B:
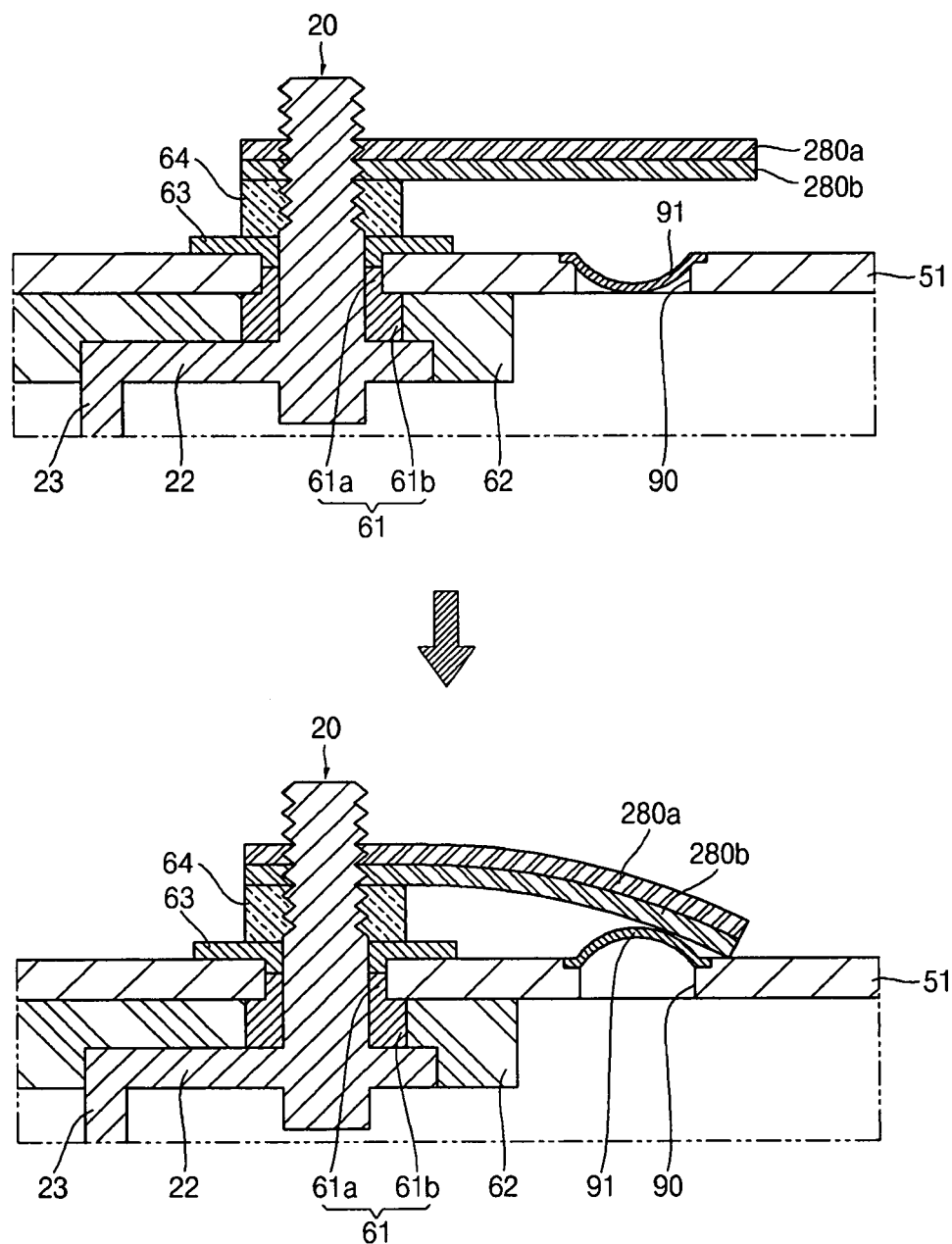
FIG. 3B illustrates an enlarged cross-sectional view of a portion 'A' illustrated in FIG. 3A, for showing operation of the safety valve.

FIG. 3A illustrates a cross-sectional view of a secondary battery according to yet another embodiment. FIG. 3B illustrates an enlarged cross-sectional view of a portion 'A' illustrated in FIG. 3A, for showing the operation of the safety valve.

The secondary battery 300 according to the present embodiment may be substantially the same as the secondary battery 200 shown in FIG. 2 in view of configuration and function, except for a short-circuit plate 91 disposed in a cap plate 51 and a safety valve 280. Thus, repeated detailed description thereof is omitted and the following description will be focused on only the differences between the secondary battery 300 and the secondary battery 200, i.e., the short-circuit plate 91 and the safety valve 280.

Referring to FIGS. 3A and 3B, the secondary battery 300 according to the present embodiment may include an electrode assembly 10, a first electrode terminal 20, a second electrode terminal 30, a case 40, a cap assembly 50, and a safety valve 280.

The cap assembly 50 may include a cap plate 51. The cap plate 51 may include a plug 53 closing an electrolyte injection hole 52, a safety vent 54 having a relatively small thickness, and a short-circuit plate 91 disposed in a short-circuit hole 90.

The short-circuit plate 91 may be disposed in the short-circuit hole 90 at one side of the cap plate 51. The short-circuit plate 91 may include an inversion plate having a round portion that is downwardly convex and a flange portion fixed to the cap plate 51. When an internal pressure of the secondary battery 300 becomes greater than a predetermined pressure due to, e.g., overcharge, the short-circuit plate 91 may be inverted so that it protrudes to be upwardly convex. The short-circuit plate 91 may be electrically connected to the cap plate 51; and the short-circuit plate 91 and the cap plate 51 may have the same polarity as each other.

The safety valve 280 may be coupled to an upper portion of the first electrode terminal 20 and may be disposed above the cap plate 51 and outside the case 40. The safety valve 280 may be formed of a bimetal including a first expansion layer 280*a* and a second expansion layer 280*b* having different thermal expansion coefficients from one another. The safety valve 280 may be electrically connected to the first electrode terminal 20.

With the aforementioned configuration, the short-circuit plate 91 and the safety valve 280 may operate as follows.

Heat may be generated in the secondary battery 300 due to, e.g., overcharge, etc., and the internal pressure of the secondary battery 300 may increase. The internal heat may be transmitted to the safety valve 280 through the first electrode terminal 20. When the internal temperature of the secondary battery 300 is about 80° C. to about 150° C., or exceeds about 80° C., the safety valve 280 may expand. When the internal temperature of the secondary battery 300 is lower than about 80° C., the safety valve 280 may not operate, i.e., may not contact the cap plate 51. When the internal temperature of the secondary battery 300 is higher than about 150° C., the reliability and safety of the secondary battery 300 may deteriorate. Since the safety valve 280 may be made of a bimetal having different thermal expansion coefficients, the first expansion layer 280*a* having a larger thermal expansion coefficient may expand more than the second expansion layer 280*b* at the same temperature. Therefore, the safety valve 280 may be bent downwardly. In addition, when the internal pressure increases until it exceeds a predetermined pressure, the short-circuit plate 91 may protrude to be upwardly convex, i.e., may invert, to then be short-circuited with the safety valve 280. In other words, when the internal heat and pressure of the secondary battery 300 excessively increase due to, e.g., overcharge, the safety valve 280 may be short-circuited with the short-circuit plate 91, thereby interrupting charging and discharging of the secondary battery 300 to avoid a danger, e.g., fire or explosion.

As described above, since the secondary battery 300 according to the present embodiment may include the safety valve 280 made of a bimetal and the short-circuit plate 91. The safety valve 280 may be bent and the short-circuit plate 91 may be inverted when the internal temperature and pressure increase due to, e.g., overcharge. Accordingly, the secondary battery 300 may have improved safety by preventing fire or explosion.

As described above, since the secondary battery according to an embodiment includes a safety valve electrically connected to the first electrode terminal and made of a bimetal, the safety of the secondary battery is ensured by an electrical short-circuit between the cap plate and the safety valve that may be bent when excessive heat is generated within the secondary battery. Accordingly, the secondary battery may have improved safety.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   an electrode assembly including a first electrode plate, a second electrode plate, and a separator disposed between the first electrode plate and the second electrode plate;
   a case accommodating the electrode assembly;
   a cap plate sealing the case;
   a first electrode terminal electrically connected to the first electrode plate and penetrating through the cap plate; and
   a safety valve coupled to the first electrode terminal located on a top surface of the cap plate, the safety valve including a bimetal element,
   wherein the safety valve is configured to effect an electrical short-circuit on the top surface of the cap plate when an internal temperature of the secondary battery is greater than about 80° C.

2. The secondary battery as claimed in claim 1, wherein the bimetal element includes a first expansion layer and a second expansion layer, the second expansion layer having a thermal expansion coefficient smaller than a thermal expansion coefficient of the first expansion layer.

3. The secondary battery as claimed in claim 2, wherein the second expansion layer faces the top surface of the cap plate.

4. The secondary battery as claimed in claim 3, wherein the safety valve is configured to effect an electrical short-circuit on the top surface of the cap plate when the internal temperature of the secondary battery is about 80° C. to about 150° C.

5. The secondary battery as claimed in claim 1, wherein the first electrode terminal includes:
   a first terminal body penetrating through the cap plate;
   a first terminal connection part electrically connected to the first terminal body and being disposed under the cap plate; and
   a first terminal extension part extending from the first terminal connection part in a vertical direction and being welded to the electrode assembly.

6. The secondary battery as claimed in claim 5, wherein the safety valve is coupled to an upper portion of the first terminal body and disposed outside the case.

7. The secondary battery as claimed in claim 1, wherein the cap plate includes:
   a short-circuit hole disposed at one side thereof, and
   a downwardly convex short-circuit plate disposed in the short-circuit hole.

8. The secondary battery as claimed in claim 7, wherein the short-circuit plate is electrically connected to the cap plate.

9. The secondary battery as claimed in claim 7, wherein the short-circuit plate is constructed to change its shape to be upwardly convex and to protrude toward the safety valve such as to effect a short-circuit with the safety valve when an internal pressure of the secondary battery exceeds a predetermined pressure.

10. The secondary battery as claimed in claim 1, wherein the first electrode terminal and the cap plate have opposite polarities.

11. The secondary battery as claimed in claim 1, further comprising a second electrode terminal electrically connected to the second electrode plate, the second electrode terminal having the same polarity as the cap plate.

12. The secondary battery as claimed in claim 11, wherein the second electrode terminal includes:
   a second terminal body penetrating through the cap plate;
   a second terminal connection part electrically connected to the second terminal body and disposed under the cap plate; and
   a second terminal extension part extending from the second terminal connection part in a vertical direction and being welded to the electrode assembly.

13. The secondary battery as claimed in claim 1, wherein the safety valve is directly coupled to the first electrode terminal.

* * * * *